Patented July 31, 1945

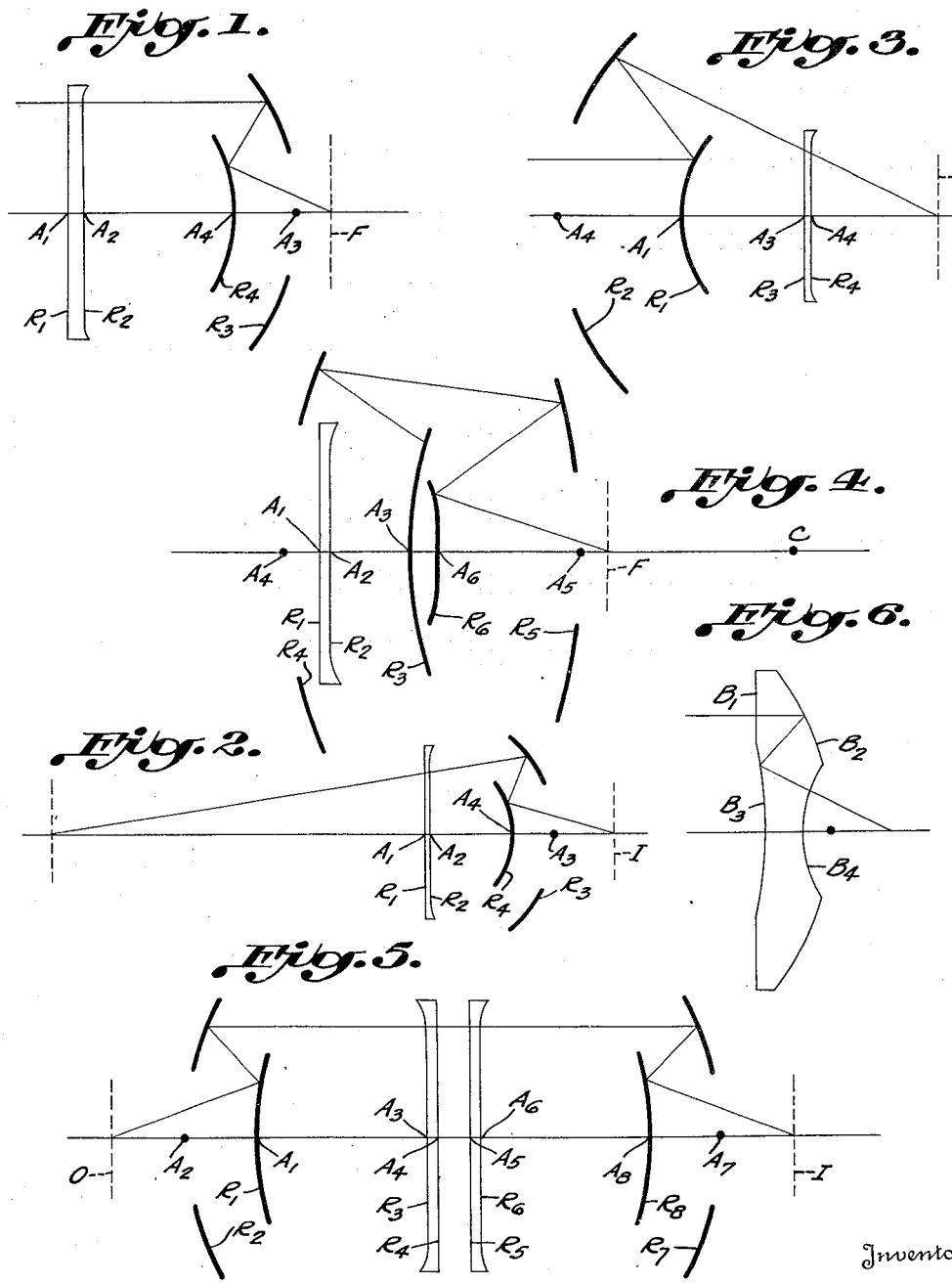

2,380,887

UNITED STATES PATENT OFFICE 2,380,887

OPTICAL SYSTEM

Arthur Warmisham, Leicester, England, assignor to Taylor, Taylor & Hobson Limited, Leicester, England, a British company Original application May 22, 1941, Serial No. 394,709. Divided and this application March 10, 1942, Serial No. 434,131. In Great Britain May 2, 1940

12 Claims. (Cl. 88—57)

This application is a division of my copending application Serial Number 394,709, filed May 22, 1941, which has become Patent No. 2,363,379, dated December 7, 1943, and the invention relates to optical systems for use as optical objectives for various purposes, including photographic and projection objectives and microscope and telescope objectives. Such objectives have hitherto usually been constituted by a system of refracting lenses, and serious difficulties have consequently arisen in achieving any refined correction of chromatic aberration. The use of reflecting surfaces would avoid such difficulties, and the present invention has for its object to provide a satisfactory objective in which the optical power is supplied by curved reflecting surfaces.

In order to correct a concave mirror for spherical aberration it has been usual to make it paraboloidal, but a paraboloidal mirror has serious uncorrected coma and astigmatism and can only be used in practice for a very small angular field.

It has recently been discovered that a concave spherical mirror can be simultaneously corrected for spherical aberration, coma and astigmatism by providing in front of the mirror at or near its centre of curvature a correcting element in the form of a substantially afocal plate constituted by a deformed plane parallel plate. Such an arrangement is of restricted practical value since the focal surface of the mirror is a spherical surface concentric with the mirror and of half the radius thereof.

A further object of the invention is to provide an optical system in which the optical power is supplied by spherical reflecting surfaces and in which correction is afforded for spherical and chromatic aberrations and for coma and astigmatism with the use of a minimum number of correcting elements. For achieving this object the optical system may comprise two or more spherical reflecting surfaces having substantially the same "equivalent centre of curvature" and means disposed at such common centre for simultaneously correcting, at least to the first order, for the spherical aberration, coma and astigmatism of such reflecting surfaces.

It is to be understood that the phrase "equivalent centre of curvature" is herein used to mean either the geometrical centre of curvature of the surface or, if there are any intervening elements, the image of such centre formed by paraxial imagery by such intervening elements.

The correcting means preferably comprise a substantially afocal correcting surface intersecting the optical axis substantially at the common equivalent centre of curvature of the spherical reflecting surfaces. Such correcting surface may be paraxially afocal, in which case it will consist of a surface of revolution generated by rotation about the $x$-axis (that is the optical axis of the system) of a curve of the form $$x = Ay^4 + By^6 + \ldots \text{ higher even powers of } y$$

wherein the coefficients A, B . . . (which determine the extent of deformation of the surface from a plane surface) are such that the surface will correct for the spherical aberration, coma and astigmatism of the spherical reflecting surfaces. The coefficient A, which may be termed the coefficient of the first-order deformation, is associated with the correction of the first-order aberrations, and the coefficient B of the second-order deformation is likewise associated with the correction of the second-order aberrations, and so on. It may be mentioned that the first-order deformation of the surface will be the algebraic sum of the first-order deformations required for correction of the first-order aberrations of the individual surfaces, but this relationship does not obtain for the higher order deformations.

The afocal correcting surface may be constituted by one of the surfaces of a plate through which the light is transmitted, or alternatively may be in the form of a reflecting surface.

The invention may be carried into practice in various ways, but some convenient arrangements according thereto are diagrammatically illustrated in the accompanying drawing, in which Figure 1 illustrates a simple arrangement of optical system which can be used, in conjunction with other optical elements, for a variety of purposes, Figures 2 and 3 respectively show modifications of the arrangement of Figure 1, Figure 4 illustrates the application of the invention to an anastigmatic photographic objective, Figure 5 illustrates the application of the invention to a copying objective, and Figure 6 illustrates one practical constructional form for a pair of reflecting surfaces, as applied by way of example to the arrangement of Figure 1.

In the arrangement of Figure 1, the optical system comprises two approximately concentric spherical mirrors and one correcting plate. The light after passing through the correcting plate $R_1 R_2$ is reflected at one of the mirrors $R_3$ which is annular and concave, and then again at the other mirror $R_4$, which is convex, whence it passes through the middle of the concave mirror $R_3$ to the focal plane F. The correcting plate is thin with its front surface $R_1$ plane, whilst its rear surface $R_2$, which intersects the optical axis substantially at the common centre of curvature $A_3$ of the two mirrors $R_3 R_4$ consists of an afocal surface deformed from the true plane to an extent sufficient to correct for the algebraic sum of the first order aberrations of the two mirrors. Thus the rear surface $R_2$ of the plate is slightly convex towards the front, and its position and shape are such that its spherical aberration, coma and astigmatism substantially balance out those of the two mirrors $R_3 R_4$.

Approximate numerical data for one example of this arrangement, calculated to give correction for the case of an infinitely distant object, are given in the following table, wherein (as also in the various other tables set out below) $R_1 R_2 \ldots$ represent the radius of curvature of the individual surfaces counting from the front (the positive sign indicating that the surface is convex to the front and the negative that it is concave thereto), and $D_{12} D_{23} \ldots$ represent the distances between the vertices $A_1 A_2$, $A_2 A_3$ of such surfaces (the minus sign where given indicating that the second of the two surfaces is in front of the first). The equation to the generating curve is given instead of the radius of curvature in the case of a correcting surface, the surface being generated by rotation of such curve about the optical axis. The equation is given in Cartesian coordinates with origin at the vertex and with the $x$ axis coincident with the optical axis.

*Example I*

| Radius | Thickness or air separation | Refractive index $n_D$ |
|---|---|---|
| $R_1 \infty$ | | 1.5 |
| $R_2 x = +.41 y^4 +$ higher order terms | $D_{12}$ 0 | |
| $R_3 -.863$ | $D_{23}$ .86 | |
| $R_4 -.608$ | $D_{34} -.259$ | |

Distance of focal plane F from $R_4 +.39$.
Equivalent focal length 1.0.

Figure 2 shows a modification of Figure 1 giving correction for the case of a magnification X2, and numerical data are given in the following table.

*Example II*

| Radius | Thickness or air separation | Refractive index $n_D$ |
|---|---|---|
| $R_1 \infty$ | | 1.5 |
| $R_2 x = +.368 y^4 +$ higher order terms | $D_{12}$ 0 | |
| $R_3 -1.0$ | $D_{23}$ 1.0 | |
| $R_4 -.667$ | $D_{34} -.333$ | |

Distance of object in front of $R_1$ 3.0.
Distance of image behind $R_4$ .833.
Equivalent focal length 1.0.

These two examples are both strongly over-corrected for field curvature. Thus, if a paraxially afocal plate is used, the condition for precise annulment of the Petzval curvature is that the curvatures of the two mirrors should be equal and opposite. It is not, however, possible for two concentric surfaces to have equal curvature and there must therefore be some considerable residual field curvature aberration. Some slight divergence from strict concentricity or from accurate positioning of the correcting surface at the common centre is, however, sometimes desirable.

Similar considerations also apply to Example III, which is shown in Figure 3 and of which numerical data are given below, this example differing from the first two examples primarily in the order in which the light is incident on the surfaces. Thus in this case the light is first reflected at the convex mirror $R_1$ and then by the concave mirror $R_2$ before passing the correcting plate $R_3 R_4$ to the focal plane F.

*Example III*

| Radius | Thickness or air separation | Refractive index $n_D$ |
|---|---|---|
| $R_1 +1.0$ | | |
| $R_2 +2.0$ | $D_{12} -1.0$ | |
| $R_3 \infty$ | $D_{23}$ 2.0 | |
| | $D_{34}$ 0 | 1.5 |

$R_4 x = +.0625 y^4 +$ higher order terms.
Distance of focal plane F from $R_4 +1.0$.
Equivalent focal length 1.0.

The foregoing arrangements may be modified to employ a reflecting correcting surface in place of the transmitting correcting plate, and an example of such modification will be described below with reference to Example IV.

It has already been mentioned that a simple system employing two substantially concentric spherical mirrors and a single correcting surface will of necessity be strongly over-corrected for the field curvature aberration. Such a system will therefore seldom be of much practical utility by itself, but it finds useful practical application in combination with other optical elements, for example with elements under-corrected for field curvature. Thus for instance the system may be employed in combination with other spherical reflecting surfaces (appropriately corrected in accordance with the present invention or otherwise) to form an anastigmatic photographic or projection objective having a substantially flat image field. Such an arrangement would be closely analogous to some of the arrangements described in the specification of the present applicant's copending United States of America patent application Serial No. 394,709, from which the present application has been divided and would have the advantage of reducing the number of correcting surfaces employed therein. Again the system can be combined with other elements to form a copying objective, or can constitute part of the complete optical system of a telescope or microscope.

Thus for instance the system can be usefully applied as a low power telescope objective in combination with a suitable eyepiece having under-corrected field curvature and free from astigmatism. The system can also be used as an erector between an objective and an eyepiece in a telescope, the over-correction of the field curvature balancing the sum of the under-corrections of the objective and the eyepiece, so as to produce a flat image field. Again, if the spherical aberration, coma and astigmatism of the system are corrected for a specified magnification, say 25X or 50X, the system can be used as a microscope objective in combination with a suitable eyepiece having as under-corrected curved field free from astigmatism. Another application of the system is as part of a flat-field microscope objective in combination with an under-corrected member of very high aperture.

Example IV, which is shown in Figure 4 and of which numerical data are given below, is intended more especially for use as an anastigmatic objective for photographic purposes, but is also suitable as a projection objective or as a telescope objective. This example employs three spherical reflecting surfaces and two correcting elements, one of which transmits the light whilst the other reflects it. Thus the light, after passing through the first correcting element $R_1$ $R_2$ is reflected in turn at a convex spherical surface $R_3$ and two annular concave spherical surfaces $R_4$ $R_5$, after which it is again reflected at the reflecting correcting surface $R_6$ before passing to the focal plane F.

*Example IV*

| Radius | Thickness or air separation | Refractive index $n_D$ |
|---|---|---|
| $R_1$ ∞ | | |
| $R_2$ $x=+.0936\ y^4+$higher order terms | $D_{12}$ 0 | 1.5 |
| $R_3+1.550$ | $D_{23}$ .32 | |
| $R_4+2.045$ | $D_{34}-$ .50 | |
| $R_5-3.702$ | $D_{45}$ 1.20 | |
| | $D_{56}-$ .58 | |

$R_6$ $x=-.0260\ y^4+$higher order terms.
Distance of focal plane F from $R_6+.685$.
Equivalent focal length 1.000.

In this example it will be seen that the surfaces $R_3$ and $R_4$ are approximately concentric, with their common centre C about .845 behind $R_5$. It can readily be shown that the paraxial image $R_6$ formed by $R_5$ is approximately at this common centre C. The reflecting correcting surface $R_6$ is thus approximately in the correct position for simultaneous correction of the aberrations of $R_3$ and $R_4$, and its deformation is such as to effect such correction. The aberrations of the surface $R_5$ are corrected by the deformation of the surface $R_2$. The curvature of the surface $R_3$ is only slightly less than the sum of the curvatures of the surfaces $R_4$ and $R_5$, so that there is small residual field curvature, and it may be noted that this example has been designed not only to obtain correction for first order aberrations, but also to reduce higher order spherical aberration terms with a view to obtaining an increased aperture.

As has been mentioned, the optical system according to the invention can be employed as part of a copying objective, and numerical data for an example of this (shown in Figure 5) are given in the table below. This example, which is intended for equal scale copying, consists of a symmetrical arrangement of two optical systems according to the invention the two correcting usrfaces being disposed between the two pairs of spherical mirrors. The light is first reflected at a convex mirror $R_1$ and then at an annular concave mirror $R_2$, whence after passing through the two correcting plates $R_3$ $R_4$ and $R_5$ $R_6$ it is reflected in turn at an annular concave mirror $R_7$ and at a convex mirror $R_8$. This example has been calculated to correct for higher order aberrations also.

*Example V*

| Radius | Thickness or separation | Refractive index $n_D$ | Abbé V number |
|---|---|---|---|
| $R_1+1.170$ | | | |
| $R_2+1.170$ | $D_{12}-.2925$ | | |
| $R_3$ $x=-.1117\ y^4-.03844\ y^6-$ $.006048\ y^8+.01735\ y^{10}$ | $D_{23}$ .9750 | | |
| $R_4$ ∞ | $D_{34}$ .0403 | 1.613 | 59.3 |
| $R_5$ ∞ | $D_{45}$ .1450 | | |
| $R_6$ $x=+.1117\ y^4+.03844\ y^6+$ $.006048\ y^8-.01735\ y^{10}$ | $D_{56}$ .0403 | 1.613 | 59.3 |
| $R_7-1.170$ | $D_{67}$ .9750 | | |
| $R_8-1.170$ | $D_{78}-.2925$ | | |

Distance of object plane O in front of $R_1$ .585.
Distance of image plane I behind $R_8$ .585.
Equivalent focal length 1.000.

In this example the surface $R_3$ is disposed at the centre of the spherical mirror $R_7$ and at the paraxial image in the spherical mirror $R_2$ of the centre of the spherical mirror $R_1$, and its deformation corrects for the aberrations of the mirrors $R_1$ and $R_7$, whilst the deformation of the surface $R_6$ likewise corrects for the aberrations of the spherical mirrors $R_2$ and $R_8$. The sum of the curvatures of the convergent surfaces $R_2$ and $R_7$ is equal to the sum of the curvatures of the divergent surfaces $R_1$ and $R_8$, so that the objective gives an image field flat to the first order. This example gives correction for all aberrations, including distortion, not only to the first order, but also to higher orders. The arrangement has been calculated for unit magnification copying, but can readily be modified for other usual copying magnifications. If desired, the two correcting plates can be combined together into a single plate, whose two faces are shaped to constitute the two correcting surfaces $R_3$ and $R_6$. With a plate of axial thickness .314, the other numerical data can remain unaltered.

It will be appreciated that the foregoing arrangements have been described by way of example only and may be modified in various ways within the scope of the invention. Thus for instance the numerical examples given above have been calculated for the most part to correct for first order aberrations only, and some modifications will be required when higher order terms are considered. Such modifications will however usually involve only relatively slight numerical changes without any material alteration in the arrangement of the objective.

Again the various reflecting surfaces in the foregoing examples have been separated by air gaps, but it will be appreciated that they may, if desired, be formed as internally reflecting surfaces. Thus, for instance, as shown in Figure 6, the two spherical mirrors of Figure 1 can be formed as internally reflecting surfaces on a single piece of glass, having a plane annular entrance surface $B_1$, a concave spherical annular internally reflecting surface $B_2$ (corresponding to the surface $R_3$ of Figure 1), a convex spherical internally reflecting surface $B_3$ (corresponding to the surface $R_4$ of Figure 1) and an exit surface $B_4$, which may be (as shown) spherical and concentric with the axial focal point of the system or may be plane, within and adjacent to the annular surface $B_2$. The two internally reflecting surfaces are preferably metallised.

What I claim as my invention and desire to secure by Letters Patent is:

1. An optical system including a plurality of axially aligned spherical reflecting surfaces having substantially the same equivalent centre of curvature, and means disposed substantially at such common centre for simultaneous correcting for the spherical aberration, coma and astigmatism of such surfaces.

2. An optical system as claimed in claim 1, in which the correcting means comprises a substantially afocal correcting surface.

3. An optical system as claimed in claim 1, in which the correcting means comprises a substantially afocal correcting surface constituted by one of the surfaces of a plate through which the light is transmitted.

4. An optical system as claimed in claim 1, in which the correcting means comprises a substantially afocal correcting surface in the form of a reflecting surface.

5. An optical system as claimed in claim 1, in which the correcting means comprises a substantially afocal correcting surface constituted by a surface of revolution generated by rotation about the $x$-axis (that is the optical axis of the system) of a curve of the form (in Cartesian coordinates $x, y$)

$$x = Ay^4 + By^6 + \ldots + \text{higher even powers of } y$$

wherein the coefficients A B ... (which determine the extent of deformation of the surface from a plane surface) are such that the surface will correct for the spherical aberration, coma and astigmatism of the associated spherical reflecting surfaces.

6. An optical objective comprising three axially aligned spherical reflecting surfaces of which two are convergent and one divergent, two of such surfaces having the same equivalent centre of curvature, a substantially afocal correcting surface intersecting the optical axis substantially at such common centre and acting to correct simultaneously for the spherical aberration, coma and astigmatism of the two associated spherical surfaces and a second substantially afocal correcting surface for correcting for the spherical aberration, coma and astigmatism of the third spherical surface.

7. An optical objective as claimed in claim 6, in which the first afocal correcting surface is in the form of a reflecting surface, and the second afocal correcting surface is constituted by one of the surfaces of a plate through which the light is transmitted the opposite surfaces of such plate being plane.

8. An optical objective comprising two pairs of axially aligned spherical reflecting surfaces, the two surfaces of each pair having substantially the same equivalent centre of curvature, and two substantially afocal correcting surfaces respectively disposed substantially at such two common centres, and each acting to correct for the spherical aberration, coma and astigmatism of the associated pair of spherical surfaces.

9. An optical objective as claimed in claim 8, in which two of the four spherical surfaces are convergent and have approximately the same total curvature as the other two surfaces, which are divergent.

10. An optical objective as claimed in claim 9, in which the two afocal correcting surfaces are each constituted by one of the surfaces of a plate through which the light is transmitted, the elements of the objective being symmetrically arranged.

11. An optical objective comprising three axially aligned spherical reflecting surfaces, one substantially afocal reflecting correcting surface, and one substantially afocal correcting surface constituted by a plate through which the light is transmitted; and having numerical data substantially as set forth in the following table where $R_1 R_2 \ldots$ represent the radii of curvature of the individual surfaces (the positive sign indicating that the surface is convex to the front and the negative sign that it is concave thereto), the equations to the generating curves being given in place of the radii in the case of the correcting surfaces, and $D_{12} D_{23} \ldots$ represent the axial separations between the individual surfaces:

| Radius | Thickness or air separation | Refractive index $n_D$ |
|---|---|---|
| $R_1 \infty$ | | 1.5 |
| $R_2 x = +.0936 y^4 +$ higher order terms | $D_{12}$ 0 | |
| $R_3 + 1.550$ | $D_{23}$ .32 | |
| $R_4 + 2.045$ | $D_{34}$ .50 | |
| $R_5 - 3.702$ | $D_{45}$ 1.20 | |
| | $D_{56}$ — .58 | |

$R_6 x = -.0260 y^4 +$ higher order terms.
Distance of focal plane F from $R_6 + .685$.
Equivalent focal length 1.000.

12. An optical objective comprising four axially aligned spherical reflecting surfaces and two substantially afocal correcting surfaces each constituted by one surface of a plate through which the light is transmitted, and having numerical data substantially as set forth in the following table where $R_1 R_2 \ldots$ represent the radii of curvature of the individual surfaces (the positive sign indicating that the surface is convex to the front and the negative sign that it is concave thereto), the equations to the generating curves being given in place of the radii in the case of the correcting surfaces, and $D_{12} D_{23} \ldots$ represent the axial separations between the individual surfaces:

| Radius | Thickness or separation | Refractive index $n_D$ | Abbé V number |
|---|---|---|---|
| $R_1 + 1.170$ | $D_{12}$ —.2925 | | |
| $R_2 + 1.170$ | | | |
| $R_3 x = -.1117 y^4 - .03844 y^6 - .006048 y^8 + .01735 y^{10}]$ | $D_{23}$ .9750 | | |
| $R_4 \infty$ | $D_{34}$ .0403 | 1.613 | 59.3 |
| $R_5 \infty$ | $D_{45}$ .1450 | | |
| $R_6 x = +.1117 y^4 + .03844 y^6 + .006048 y^8 - .01735 y^{10}$ | $D_{56}$ .0403 | 1.613 | 59.3 |
| $R_7 - 1.170$ | $D_{67}$ .9750 | | |
| $R_8 - 1.170$ | $D_{78}$ —.2925 | | |

Distance of object plane O in front of $R_1$ .585.
Distance of image plane I behind $R_8$ .585.
Equivalent focal length 1.000.

ARTHUR WARMISHAM.